United States Patent [19]

Saito et al.

[11] Patent Number: 5,031,446
[45] Date of Patent: Jul. 16, 1991

[54] WATER LEAKAGE POSITION ESTIMATING SYSTEM

[75] Inventors: Susumu Saito; Syozo Taniguchi, both of Tokyo, Japan

[73] Assignee: Kabushiki Kaisha Toshiba, Kanagawa, Japan

[21] Appl. No.: 325,842

[22] Filed: Mar. 20, 1989

[30] Foreign Application Priority Data

Apr. 12, 1988 [JP] Japan .................... 63-88085

[51] Int. Cl.⁵ .............................. G01M 3/24
[52] U.S. Cl. .................................. 73/40.5 A
[58] Field of Search ............................. 73/40.5 A, 592

[56] References Cited

U.S. PATENT DOCUMENTS 3,626,750 12/1971 Talmon .......................... 73/40.5 A
4,543,817 10/1985 Sugiyama ....................... 73/40.5 A

FOREIGN PATENT DOCUMENTS 168527 12/1981 Japan .................... 73/40.5 A

*Primary Examiner*—Jerry W. Myracle
*Assistant Examiner*—Joseph W. Roskos
*Attorney, Agent, or Firm*—Finnegan, Henderson, Farabow, Garrett and Dunner

[57] ABSTRACT

A system for estimating water leakage position in a water supply system consisting of a plurality of water feed/distribution devices. The system includes a memory unit for storing given constants of the plurality of devices at a monitoring position, a monitoring unit for monitoring vibrating frequency of the plurality of devices, and an estimating unit for estimating water leakage position based on the stored given constants of the plurality of devices and the monitored vibrating frequency of the plurality of devices.

6 Claims, 4 Drawing Sheets

WATER LEAKAGE POSITION ESTIMATING SYSTEM

BACKGROUND OF THE INVENTION

This invention relates generally to water feed and distribution systems and, specifically, to a water leakage position estimating system and method for water feed and distribution systems.

A typical conventional method, which is put into practical use for estimating the position of water leakage of underground water main pipes or conduits, employs a sound pick-up rod. In this method, a sound pick-up rod is placed against the ground where the conduit is buried or is directly brought into contact with the buried conduit through a bore hole to detect vibrations caused by the water leakage. Vibrations picked up by and transmitted from the sound pick-up rod are mechanically or electrically amplified, and the position of water leakage is estimated by an inspector listening to the amplified vibrations through headphones. However, with this method, it is necessary to depend on the special skills of an experienced worker who can distinguish the magnitude of the sounds and slight differences in sound tone.

A device, which has been put into practice in an effort to automate the water leakage position detecting process, is the correlation type water leakage detector. In this device, the correlation function is determined by signals from vibration detectors positioned on either side of the water leakage location at parts that are exposed above ground, such as fire hydrants, sluice valves, water meters, etc. The distance to the position of water leakage can be ascertained by finding the phase lag time of the two signals for which the correlation coefficient is a maximum and multiplying that lag time by the phase speed of vibrations in the pipe.

Problems exist, however, with the above described two methods. With respect to the sound-picked method, that method depends on the personal abilities of the individual skilled worker, and in the correlation method, not only must the vibration detectors be positioned at two locations, but also the mutual correlation coefficient must be calculated in real time. Thus, the correlation method requires relatively bulky equipment for operation.

SUMMARY OF THE INVENTION

From the foregoing considerations, it is apparent that there is a need for an improved water leakage position estimating system. It is thus an object of the invention to provide an improved system and method of estimating the position of water leakage in water supply system.

Another object of the invention is to make it possible to easily and accurately estimate the position of water leakage in a water supply system.

The foregoing objects are achieved according to the present invention as embodied and broadly described herein, by providing a system for estimating water leakage position in a water supply system consisting of a plurality of water feed/distribution devices. The system comprises memory means for storing given constants of the plurality of water feed/distribution devices, monitoring means for monitoring vibrating frequency of the plurality of water feed/distribution devices, and estimating means, operative coupled to the memory means, for estimating water leakage position based on the stored given constants of the plurality of water feed/- distribution devices and the monitored vibrating frequency of the plurality of water feed/distribution devices.

According to another aspect of the present invention, the above objects are achieved by providing a method of estimating water leakage position in a water supply system consisting of a plurality of water feed/distribution devices. The method comprises the steps of storing given constants of the plurality of devices, monitoring vibrating frequency of the plurality of devices at a monitoring position, and estimating water leakage position based on the stored given constants of the plurality of devices and the monitored vibrating frequency of the plurality of devices.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

DESCRIPTION OF THE PREFERRED EMBODIMENTS

Reference will now be made in detail to the present preferred embodiments of the invention, examples of which are illustrated in the accompanying drawings.

Figure 1:
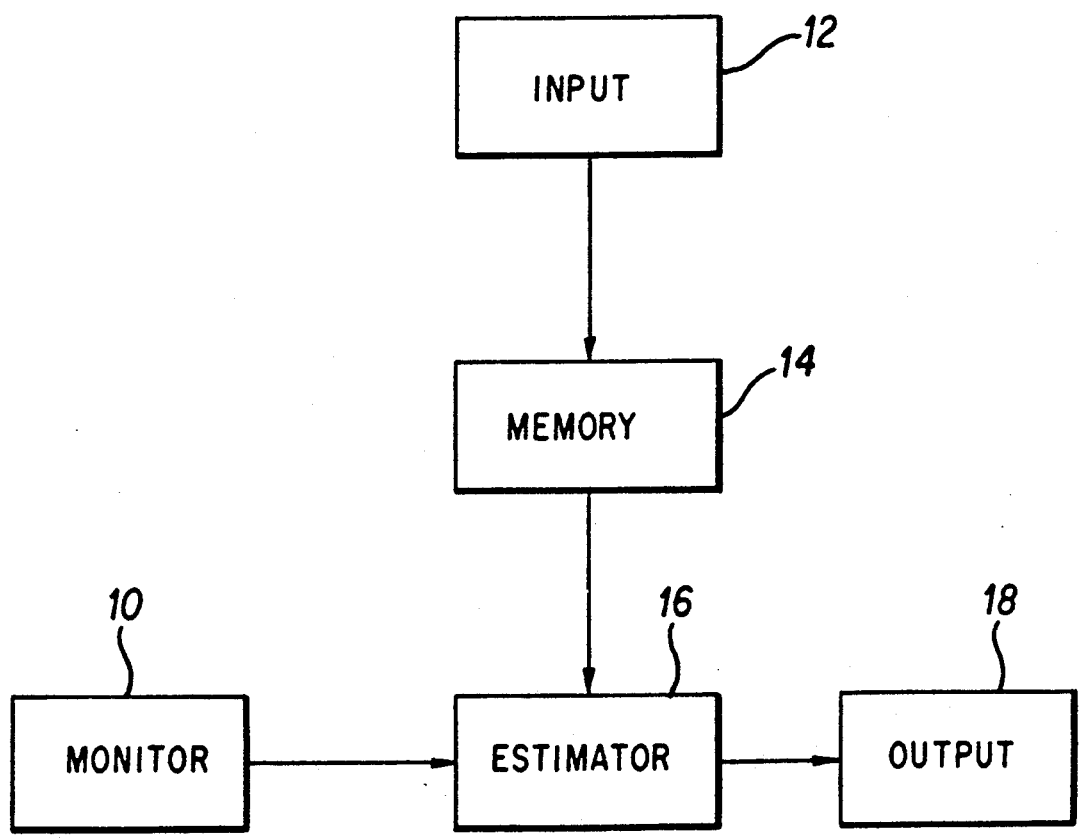
FIG. 1 is a block diagram showing a water leakage position estimating system according to this invention.

FIG. 1 shows a block diagram of an embodiment of a water leakage position estimating device according to the invention.

In FIG. 1, a monitor 10 monitors vibrating frequency of pipe vibration produced by water leakage. An input 12 allows input for the water leakage position estimating device concerning specification of water feed or distribution device constituting the vibration propagation path from the point of water leakage to the monitoring point. The main items of the water feed or distribution device specification comprises: type of water distribution piping and its aperture and length; type of water supply pipe and its aperture and length; type of T-junction pipe and its aperture; type of cross-pipe and its aperture; all of which are classified by type of water feed and distribution devices, such as fire hydrant, sluice valves, stop-cocks, water meters and the like.

A memory 14 stores frequency attenuation coefficient and frequency propagation coefficient that are characteristic of each water feed or distribution device constituting the propagation paths and stores the monitored value of frequency. An estimator 16 calculates the distance between the monitoring point and point of water leakage from the characteristic attenuation coefficient and propagation coefficient of the water feed or distribution device constituting the propagation path. Furthermore, estimator 16 calculates the monitored value of frequency. An output 18 outputs the distance obtained by the estimator 16.

The operation of estimator 16 will now be described. When water leakage occurs, irregular vibration is generated in the frequency band ranging from several tens of Hz to 10 to 20 KHz. With the lapse of time, during which the vibration is propagated through the pipes, the vibration energy is reduced. This phenomenon becomes more pronounced the higher the frequency becomes. Consequently, with increasing distance from the source of vibration, higher frequency components are reduced so that the monitored frequency becomes lower. Putting this into the form of an equation, the frequency f at an arbitrary monitoring point can be expressed by equation (1):

$$f = f_o \pi_{k \in K} C_k \exp(-a_k X_k) \quad (1)$$

where $f_o$ is the frequency at the point prescribed constant determined by the type of pipe in which the water leakage occurs. K is the set of water distribution pipes, water feed pipes, sluice valves, fire hydrants, stop cocks, water meters and the like water feed or distribution devices contained in the vibration propagation path from the point of water leakage to the point of monitoring, and $a_k$ is the frequency attenuation coefficient when vibration is transmitted through the water distribution pipes and water feed pipes. $C_k$ is the frequency propagation coefficient when vibration is transmitted through the sluice valves, fire hydrants, stop cocks, water meters, T-junction pipes, cross-pipes and the like so-called piping ancillary components. $X_k$ is the length of the distribution pipe or feed pipe having attenuation coefficient $a_k$.

Although there is attenuation in the length direction of the distribution pipes and feed pipes, in the case of the above discussed distribution pipe ancillary equipment, the chief difference depends on whether the vibration has passed through the ancillary equipment or not, length not being a factor. Thus, it can be taken that, for distribution pipes and feed pipes, $C_k = 1$, and for distribution pipe ancillary equipment, $X_k = 0$.

A specific example will now be described with reference to FIG. 2. A first water feed pipe 20 branches from a distribution pipe 22 buried below a highway. For example, feed pipe 20 is connected to the input side of a water meter 24 through a stop cock 26 and a second water feed pipe 28. Feed pipe 28 is connected to an indoor distribution piping 30 of the water user from the output side of water meter 24.

Figure 2:
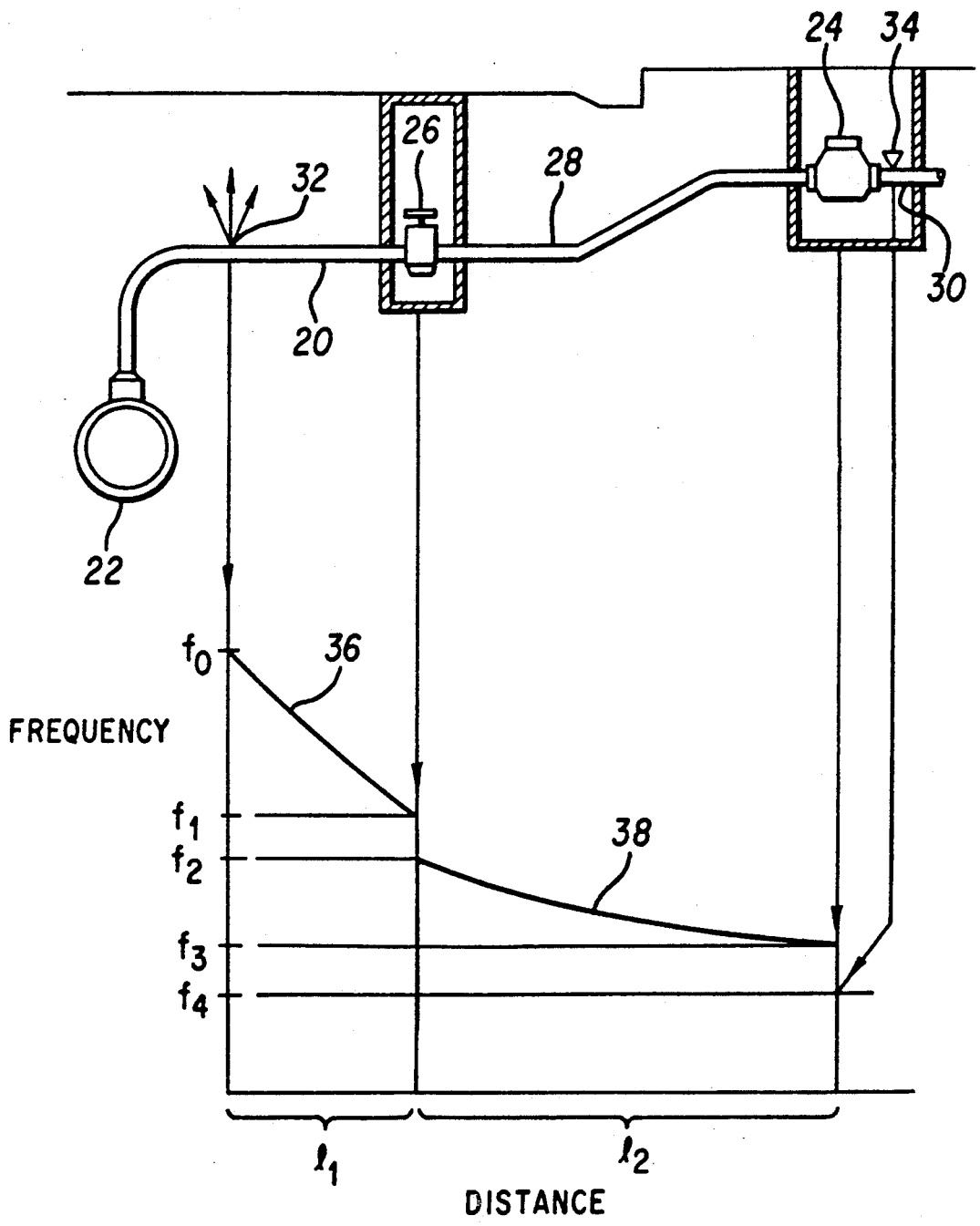
FIG. 2 is a diagram showing estimation of the water leakage position.

If water leakage occurs at a point 32 on first feed pipe 20 as shown in FIG. 2 the length $l_1$ of the feed pipe 20 from point 32 to stop cock 26 is unknown. The extension length $l_2$ of the water feed pipe from stop cock 26 to water meter 24 is known from the house plan, for example, and the frequency f4 can be measured by attaching a frequency detector to a point 34 immediately downstream of water meter 24 on pipe 30.

Curves 36 and 38 are theoretical values of frequency at arbitrary positions along respective water feed pipes 20 and 28.

Applying equation (1), the following equations (2), (3), (4) and (5) are obtained:

For water feed pipe 20: $f_1 = f_0 \exp(-a_1 l_1)$ (2)

For stop cock 26: $f_2 = C_1 f_1$ (3)

For water feed pipe 28: $f_3 = f_2 \exp(-a_2 l_2)$ (4)

For water meter 24: $f_4 = C_2 f_3$ (5)

Where $f_0$ is the frequency at the point of water leakage 32, $f_1$ and $f_2$ are the frequencies, respectively, immediately upstream and immediately downstream of stop cock 26, and $f_3$ is the frequency immediately upstream of water meter 24. If $f_3$, $f_2$ and $f_1$ are eliminated by successively substituting in equations (5), (4), (3), and (2), equation (6) is obtained:

$$f_4 = f_0 C_1 C_2 \exp(-a_l l_l) \cdot \exp(-a_2 l_2) \quad (6)$$

The type of feed pipes 20 and 28 and the dimensions of stop cock 26 and water meter 24 can be ascertained from the plans or by on site inspection, so constants $a_1$, $a_2$, $C_1$ and $C_2$ are known values. In the same way, the extension length $l_2$ of water feed pipe 28 is known, and the frequency $f_0$ at the point of water leakage is known from the type of pipe used for water feed pipe 20, so the extension length $l_l$ can be found from equation (7) as follows:

$$l_l = 1/a_l [\ln(f_0/f_4) + \ln(c_1 c_2) - a_2 l_2] \quad (7)$$

By generalising this, equation (8) is obtained:

$$x = (1/a_0)\left[\ln(f_0/f) + \sum_{i \in I} \ln C_i - \sum_{k \in K} a_k l_k\right] \quad (8)$$

where $a_o$ is the attenuation coefficient of the pipe in which the water leakage occurs, x is the extension length up to the water feed or distribution device, such as the pipe or ancillary equipment, of different type that is first encountered when following the path from the point of water leakage to the measurement point, and $l_k$ corresponds to $X_k$ in equation (1), but belongs to set K' excluding the pipe in which water leakage occurs. Set I is the set of water feed or distribution devices.

Thus, using equation (8), the point of water leakage can easily be estimated simply by inputting the monitored value of frequency and the specification of the water feed or distribution member constituting the propagation path of the vibrations from the water leakage point to the measurement point.

Figure 3:
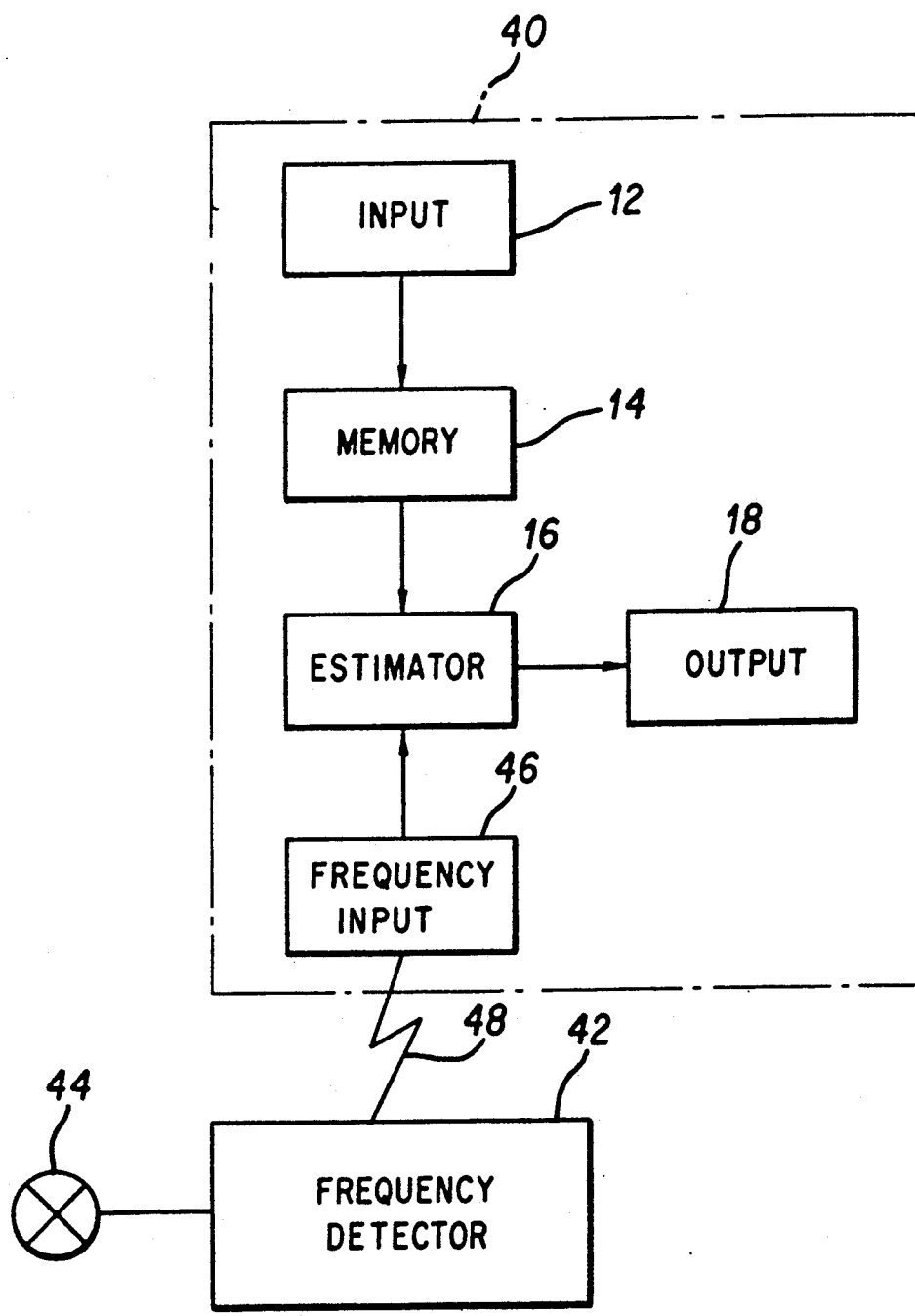
FIG. 3 and FIG. 4 are block diagrams showing further embodiments of the invention.
Figure 4:
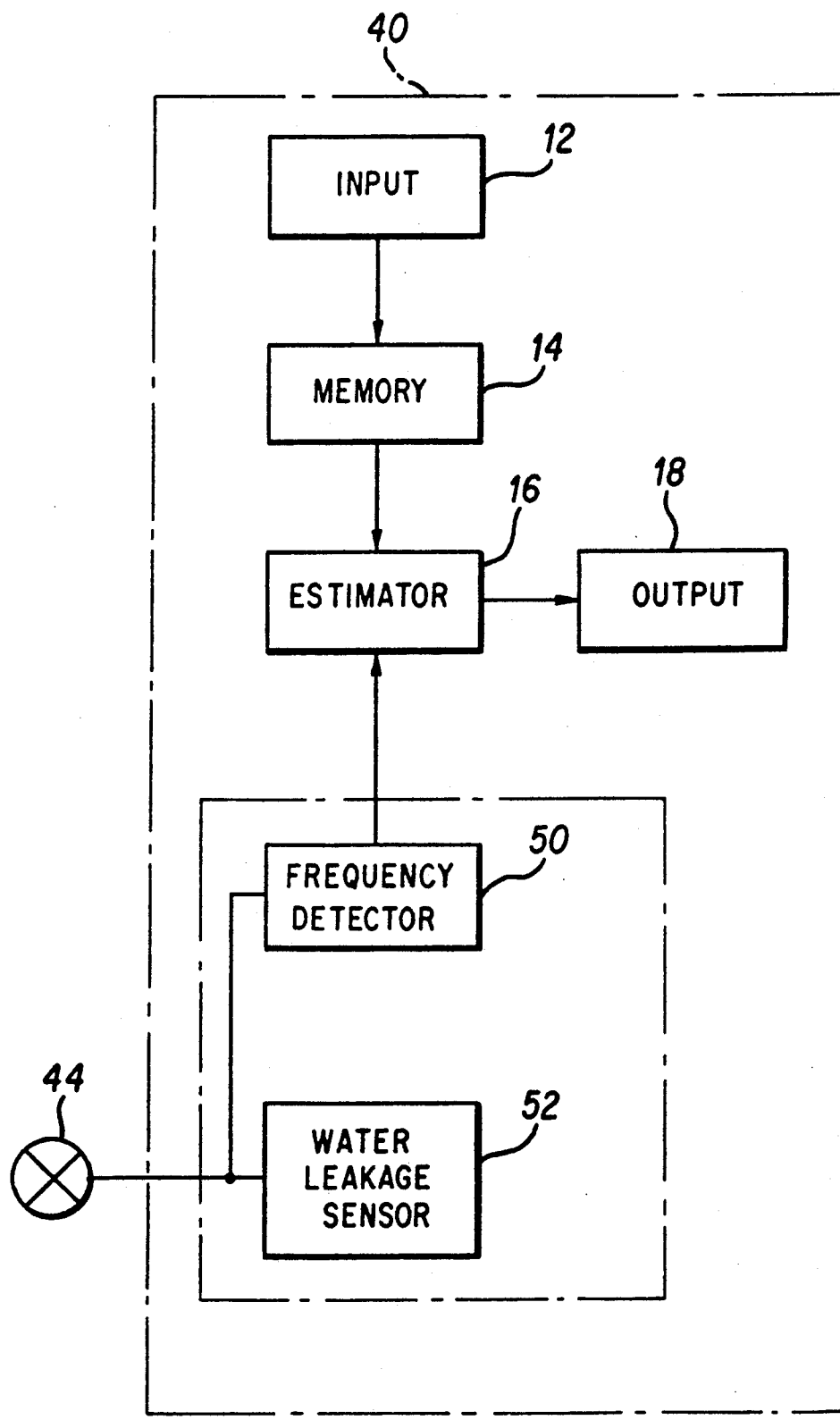

The embodiment of FIG. 1 can be constructed as a special purpose device or can be a personal computer system 40 consisting of keyboard, display device, printer, etc. as shown in FIGS. 3 and 4.

The embodiment of FIG. 3 is an example in which the output of the frequency detector that calculates the frequency from the current signal measured by a vibration sensor 44 is connected and converted into on-line form through frequency input part 46 and transmission line 48. In FIG. 4, the water leakage position estimating device consists of an integral combination of frequency detector unit 50 and water leakage detector 52. In this embodiment, the frequency input part can be omitted.

Numerous modifications and variations of the present invention are possible in light of the above teachings. It is, therefore, to be understood that, within the scope of the appended claims, the present invention can be practiced in a manner other than as specifically described herein.

What is claimed is:

1. A system for estimating water leakage position in a water supply system consisting of a plurality of water feed/distribution devices comprising:
   memory means for storing given constants of the plurality of water feed/distribution devices;
   monitoring means for detecting at a position in the water supply system distanced from the water leakage position a vibrating frequency of pipe vibration initiated by water leakage at the water leakage position; and
   estimating means for estimating the water leakage position based on the stored given constants of the plurality of water feed/distribution devices and the detected vibrating frequency.

2. The system of claim 1 wherein the estimating means includes means for calculating the distance between the monitoring means position and the water leakage position.

3. The system of claim 1 wherein the estimating means includes means for determining the distance between the water leakage position in the water feed/distribution device in which the water leakage occurs and the adjoining water feed distribution device located towards the monitoring means.

4. A method of estimating water leakage position in a water supply system consisting of a plurality of water feed/distribution devices comprising the steps of:
   storing given constants of the plurality of water feed/distribution devices;
   detecting at a position in the water supply system distanced from the water leakage position a vibrating frequency of pipe vibration initiated by water leakage at the water leakage position; and
   estimating water leakage position based on the stored given constants of the plurality of water feed/distribution devices and the detected vibrating frequency.

5. The method of claim 4 wherein the step of estimating includes the step of calculating the distance between the detecting position and a water leakage position.

6. The method of claim 5 wherein the step of estimating includes the step of determining the distance between the water leakage position in the water feed/distribution device in which the water leakage occurs and the adjoining water feed/distribution device located towards the detecting position.

* * * * *